(12) United States Patent
Shih et al.

(10) Patent No.: US 11,450,132 B2
(45) Date of Patent: Sep. 20, 2022

(54) FINGERPRINT DRIVING CIRCUIT, FINGERPRINT SENSING DEVICE, ELECTRONIC APPARATUS AND OPERATION METHOD

(71) Applicant: Novatek Microelectronics Corp., Hsinchu (TW)

(72) Inventors: Wei-Lun Shih, Hsinchu (TW); Wu Wei Lin, Taoyuan (TW); Ting-Hsuan Hung, Hsinchu (TW); Wen-Yi Hsieh, Tainan (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 17/216,705

(22) Filed: Mar. 30, 2021

(65) Prior Publication Data

US 2021/0357615 A1 Nov. 18, 2021

Related U.S. Application Data

(60) Provisional application No. 63/025,185, filed on May 15, 2020.

(51) Int. Cl.
*G06V 40/13* (2022.01)
*G06F 3/041* (2006.01)

(52) U.S. Cl.
CPC ............ *G06V 40/13* (2022.01); *G06F 3/0412* (2013.01)

(58) Field of Classification Search
None
See application file for complete search history.

(56) References Cited

U.S. PATENT DOCUMENTS

| 10,395,084 | B2 | 8/2019 | Lee et al. |
| 2018/0218191 | A1 | 8/2018 | Berget et al. |
| 2018/0260608 | A1 | 9/2018 | Liao |
| 2019/0102591 | A1 | 4/2019 | Lee et al. |
| 2019/0362672 | A1* | 11/2019 | Cui .................... H01L 27/3265 |
| 2020/0137342 | A1 | 4/2020 | Wang et al. |

FOREIGN PATENT DOCUMENTS

| CN | 107808112 | 3/2020 |
| TW | 201832064 | 9/2018 |
| TW | 201915692 | 4/2019 |

OTHER PUBLICATIONS

"Office Action of China Counterpart Application", dated Feb. 22, 2022, p. 1-p. 4.
"Notice of allowance of Taiwan Related Application, Application No. 111113538", dated Jul. 26, 2022, p. 1-p. 6.

* cited by examiner

*Primary Examiner* — Nicholas J Lee
(74) *Attorney, Agent, or Firm* — JCIPRNET

(57) ABSTRACT

In the invention, a fingerprint driving circuit, a fingerprint sensing device, an electronic apparatus, and an operation method of the fingerprint sensing device are provided. By keeping fingerprint sensing lines in a non-fingerprint sensing region in an electrically non-floating state, flash phenomenon in a display panel may be avoided.

27 Claims, 7 Drawing Sheets

FINGERPRINT DRIVING CIRCUIT, FINGERPRINT SENSING DEVICE, ELECTRONIC APPARATUS AND OPERATION METHOD

CROSS-REFERENCE TO RELATED APPLICATION

This application claims the priority benefit of U.S. provisional application Ser. No. 63/025,185, filed on May 15, 2019. The entirety of the above-mentioned patent application is hereby incorporated by reference herein and made a part of this specification.

BACKGROUND OF THE INVENTION

Field of the Invention

The invention relates to an electronic apparatus, and particularly relates to a fingerprint driving circuit, a fingerprint sensing device, and an operation method of the fingerprint sensing device.

Description of Related Art

In recent years, the demand for fingerprint sensing has gradually increased. In order to reduce the volume of an electronic apparatus, the fingerprint sensing region may be overlapped with the display region of the electronic apparatus. For example, in under-display fingerprint recognition techniques, a fingerprint sensor is embedded in the display panel, and the fingerprint sensor may sense or capture a fingerprint image through the display panel. When a touch event occurs (that is, the finger touches the display panel), the touch sensing circuit may report to the application processor of the electronic apparatus. Then, the application processor further controls the display driving circuit to drive the display panel to display an image for fingerprint sensing. Moreover, the application processor further controls the fingerprint sensing circuit to perform a fingerprint sensing operation.

SUMMARY OF THE INVENTION

The invention provides a fingerprint driving circuit, a fingerprint sensing device, an electronic apparatus, and an operation method of the fingerprint sensing device, so as to avoid display abnormality in a non-fingerprint sensing region as much as possible.

In an embodiment of the invention, the fingerprint driving circuit includes a first switch, a second switch, a current source, an analog front-end circuit, and a current or voltage source. A first terminal of the first switch is coupled to a corresponding fingerprint sensing line in a plurality of fingerprint sensing lines of a display panel. The current source is coupled to a second terminal of the first switch. The analog front-end circuit is coupled to the second terminal of the first switch. A first terminal of the second switch is coupled to the corresponding fingerprint sensing line. The current or voltage source is coupled to a second terminal of the second switch.

In an embodiment of the invention, the fingerprint sensing device senses a fingerprint on a display panel. The fingerprint sensing device includes a selecting circuit and a fingerprint driving circuit. The selecting circuit selects a fingerprint sensing region of the display panel. A non-fingerprint sensing region belongs to at least a partial region of the display panel but does not belong to the fingerprint sensing region. The fingerprint driving circuit is coupled to a plurality of fingerprint sensing lines of the display panel. When the fingerprint driving circuit performs a fingerprint sensing operation, the fingerprint driving circuit maintains the fingerprint sensing lines in the non-fingerprint sensing region in an electrically non-floating state.

In an embodiment of the invention, an electronic apparatus includes a display panel and a fingerprint sensing device. The display panel includes a plurality of fingerprint sensing lines. The fingerprint sensing device senses a fingerprint on the display panel. The fingerprint sensing device includes a selecting circuit and a fingerprint driving circuit. The selecting circuit obtains a fingerprint sensing region corresponding to a touched region of the display panel. A non-fingerprint sensing region belongs to at least a partial region of the display panel but does not belong to the fingerprint sensing region. The fingerprint driving circuit is coupled to the fingerprint sensing lines of the display panel. When the fingerprint driving circuit performs a fingerprint sensing operation, the fingerprint driving circuit maintains the fingerprint sensing lines in the non-fingerprint sensing region in an electrically non-floating state.

In an embodiment of the invention, an operation method of the fingerprint sensing device includes: selecting, by a selecting circuit, a fingerprint sensing region corresponding to a touched region of the display panel, wherein a non-fingerprint sensing region belongs to at least a partial region of the display panel but does not belong to the fingerprint sensing region; performing, by a fingerprint driving circuit, a fingerprint sensing operation on a plurality of fingerprint sensing lines in the fingerprint sensing region; and maintaining the plurality of fingerprint sensing lines in the non-fingerprint sensing region in an electrically non-floating state when the fingerprint driving circuit performs the fingerprint sensing operation on the plurality of fingerprint sensing lines in the fingerprint sensing region.

Based on the above, the fingerprint sensing device, the fingerprint driving circuit, the electronic apparatus, and the operation method of the fingerprint sensing device according to the embodiments of the invention may avoid display abnormality in the non-fingerprint sensing region of the display panel as much as possible by keeping the fingerprint sensing lines in the non-fingerprint sensing region in an electrically non-floating state.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
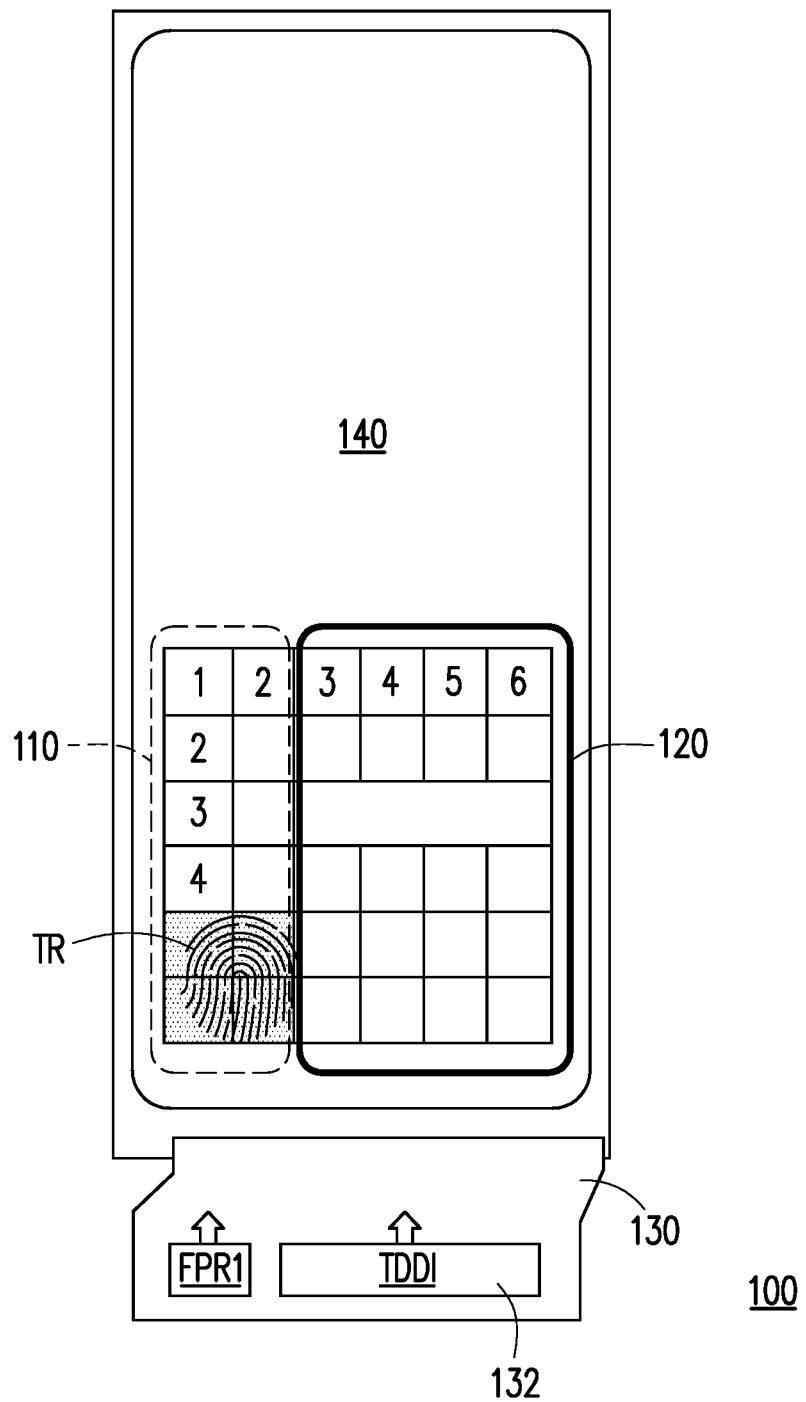
FIG. 1 is a circuit block diagram of a display panel and a driving circuit shown according to an embodiment.

The term "coupled to (or connected to)" used in the entire text of the specification of the present application (including claims) may refer to any direct or indirect connecting means. For example, if the text describes a first device is coupled to (or connected to) a second device, then it should be understood that the first device may be directly connected to the second device, or the first device may be indirectly connected to the second device via other devices or certain connecting means. Terms such as "first" and "second" mentioned in the entire specification of the present application (including the claims) are used to name the elements or to distinguish different embodiments or ranges, and are not used to restrict the upper or lower limits of the number of elements, nor are they used to limit the order of the elements. Moreover, when applicable, elements/components/steps having the same reference numerals in figures and embodiments represent the same or similar parts. Elements/components/steps having the same reference numerals or having the same terminology in different embodiments may be cross-referenced.

FIG. 1 is a circuit block diagram of a display panel and a driving circuit shown according to an embodiment. An electronic apparatus 100 shown in FIG. 1 may be any electronic apparatus having a display function, a touch sensing function, and a fingerprint sensing function. In an embodiment, the electronic apparatus 100 may be (but is not limited to) a smart phone, a non-smart phone, a wearable electronic apparatus, a tablet computer, a personal digital assistant, a notebook computer, or other electronic apparatuses that may be operated independently and have display functions, touch sensing functions, and fingerprint sensing functions. In another embodiment, the electronic apparatus 100 may be (but is not limited to) a portable or non-portable electronic apparatus in a vehicle intelligence system. In another embodiment, the electronic apparatus 100 may be (but is not limited to) a smart home appliance, such as a TV, a computer, a refrigerator, a washing machine, a telephone, an induction cooker, a lamp, and so on.

The electronic apparatus 100 shown in FIG. 1 includes a driving circuit 130 and a display panel 140. The display panel 140 contains a touch sensor (not shown) and a fingerprint sensor. The driving circuit 130 may be coupled to the display panel 140. The driving circuit 130 is adapted to drive the display panel 140. The resolution of the display panel shown is, for example, 864*1920. The display panel has a display pixel array (not shown), a touch sensor array (not shown), and a fingerprint sensor array. The driving circuit 130 shown in FIG. 1 includes a touch with display driver integration (TDDI) circuit 132 and a fingerprint driving circuit FPR1. The TDDI circuit 132 may drive the display pixel array of the display panel 140 to display an image frame. The TDDI circuit 132 may drive the touch sensor array of the display panel to obtain a touch frame. The fingerprint driving circuit FPR1 may drive the fingerprint sensor array of the display panel to obtain a fingerprint frame.

When a finger touches the display panel, the TDDI circuit 132 may detect a touched region TR of the finger and provide relevant information about the touched region TR to the fingerprint driving circuit FPR1. The fingerprint driving circuit FPR1 may temporarily divide the fingerprint sensing region of the display panel 140 into at least a fingerprint sensing region 110 and a non-fingerprint sensing region 120 according to the touched region TR of the finger. In particular, the fingerprint sensing region 110 contains the touched region TR. The fingerprint driving circuit FPR1 may perform a fingerprint sensing operation on the fingerprint sensing region 110 containing the touched region TR, but does not perform a fingerprint sensing operation on the non-fingerprint sensing region 120. In the non-fingerprint sensing region 120 where no fingerprint sensing operation is performed, the fingerprint sensing lines of the display panel 140 are electrically floating. Most lines are connected to a voltage source. The line is said to be floating (electrically floating) when the line is not electrically connected to a voltage source. Without such a connection, the voltage and current of this line are induced by the electromagnetic field or the accumulation of electric charge in the conductor, not by the voltage source. The fingerprint sensing lines in the non-fingerprint sensing region 120 are easily affected by noise, which may cause abnormal display of the display panel 140 in the non-fingerprint sensing region 120.

Figure 2:
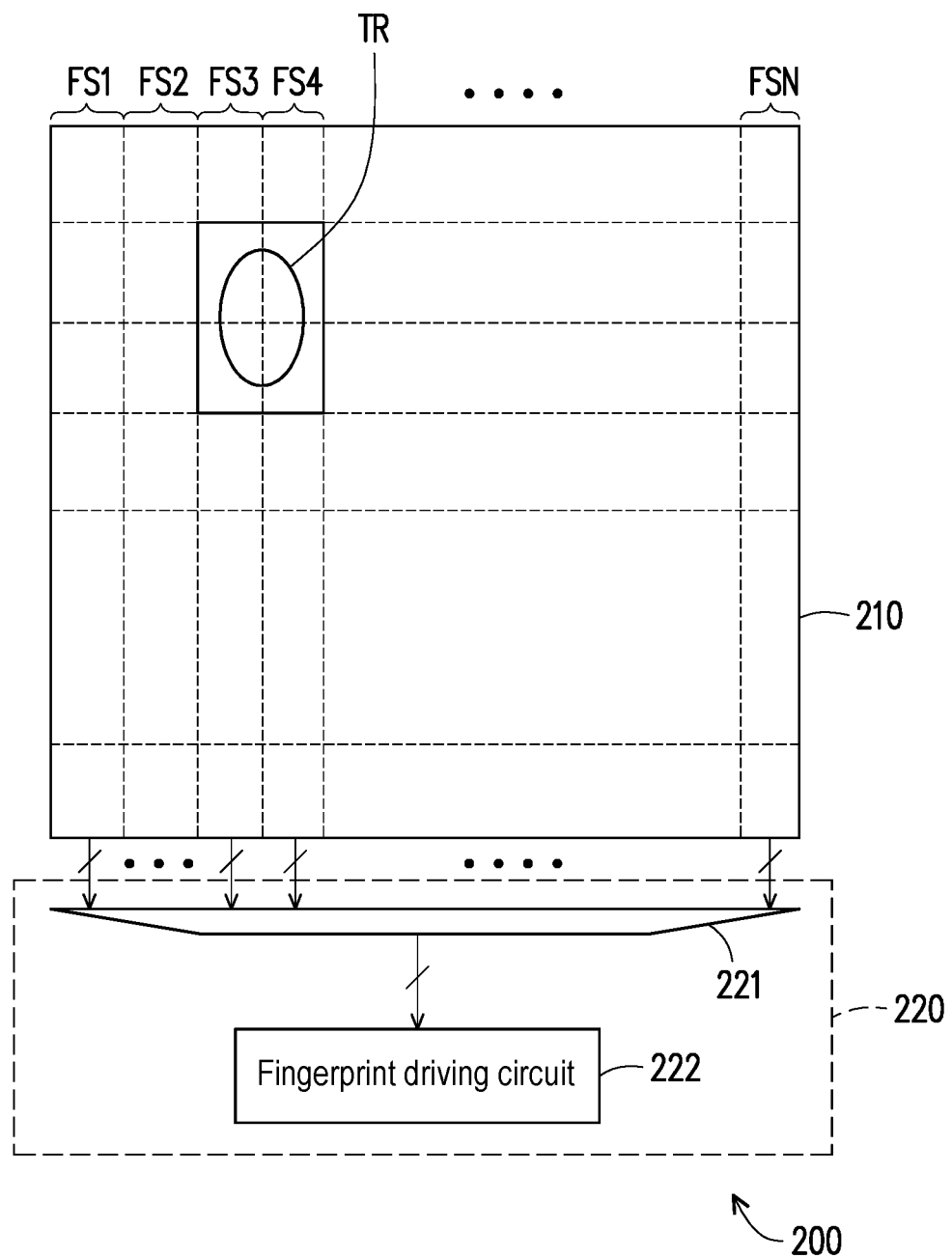
FIG. 2 is a circuit block diagram of an electronic apparatus according to an embodiment of the invention.

FIG. 2 is a circuit block diagram of an electronic apparatus 200 according to an embodiment of the invention. The electronic apparatus 200 shown in FIG. 2 includes a display panel 210 and a fingerprint sensing device 220. The display panel 210 may be any display panel having a fingerprint sensing function. The present embodiment does not limit the structure of the display panel 210. Based on actual design, the display panel 210 may be a display panel with an in-display fingerprint recognition function. For example, in some embodiments, the display panel 210 may be configured with a fingerprint sensor (not shown) containing a plurality of fingerprint sensing pixels. Based on actual design, the fingerprint sensor may be an optical fingerprint sensor or other fingerprint sensors, such as a capacitive fingerprint sensor. In some embodiments, the display panel 210 shown in FIG. 2 is as provided in related descriptions of the display panel 140 shown in FIG. 1.

A touch circuit (not shown) may perform touch sensing on the display panel 210 to obtain the touched region TR corresponding to the finger on the display panel 210. In some embodiments, the touch control circuit is as provided in the related description of the TDDI circuit 132 shown in FIG. 1. When a touch event occurs (that is, the finger touches the display panel 210), the touch circuit may provide the fingerprint sensing device 220 with information related to the touched region TR.

The display panel 210 includes a plurality of fingerprint sensing lines, and the fingerprint sensing lines may be divided into a plurality of sensing groups, such as a sensing group FS1, a sensing group FS2, a sensing group FS3, a sensing group FS4 . . . a sensing group FSn shown in FIG. 2. In the embodiment shown in FIG. 2, all fingerprint sensing pixels in the fingerprint sensing region of the display panel 210 may be divided into a plurality of fingerprint sensing blocks. The fingerprint sensing device 220 is coupled to the fingerprint sensing lines of the display panel 210 to sense a fingerprint on the display panel 210. Based on the touched region TR, the fingerprint sensing device 220 may temporarily divide the fingerprint sensing region of the display panel 210 into at least a fingerprint sensing region (such as the sensing groups FS3 and FS4 shown in FIG. 2)

and a non-fingerprint sensing region (such as the sensing groups FS1, FS2, and FSn shown in FIG. 2). A non-fingerprint sensing region belongs to at least a partial region of the display panel 210 but does not belong to the fingerprint sensing region.

Figure 3:
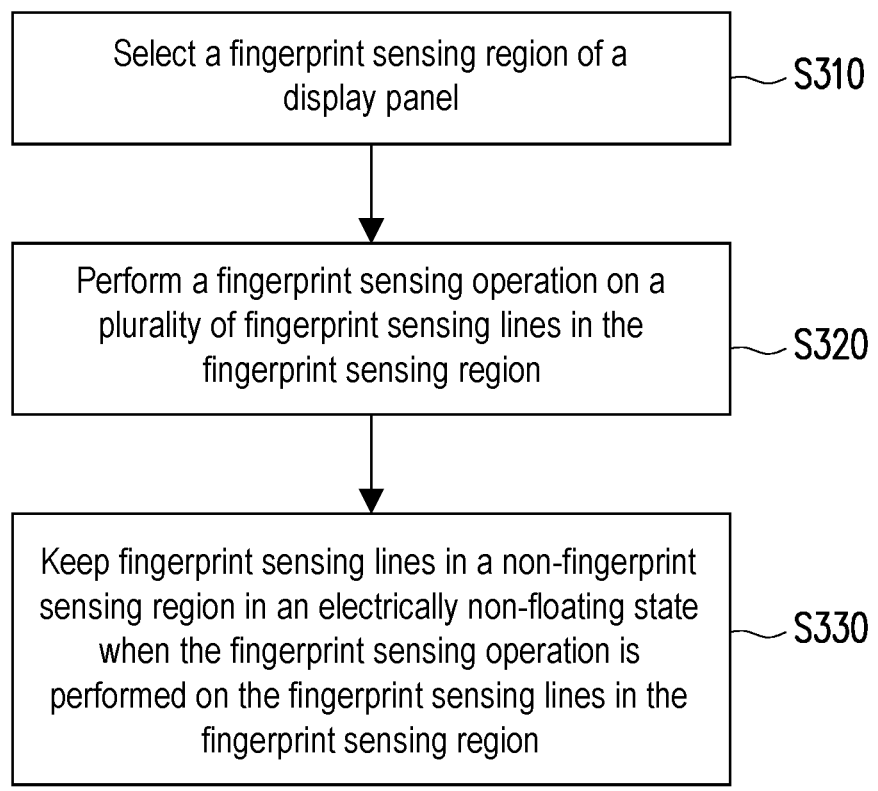
FIG. 3 is a flowchart of an operation method of a fingerprint sensing device according to an embodiment of the invention.

FIG. 3 is a flowchart of an operation method of a fingerprint sensing device according to an embodiment of the invention. Referring to FIG. 2 and FIG. 3, the fingerprint sensing device 220 includes a selecting circuit 221 and a fingerprint driving circuit 222. In step S310, the selecting circuit 221 may select the fingerprint sensing region of the display panel 210 (the sensing region corresponding to the touched region TR, such as the sensing groups FS3 and FS4 shown in FIG. 2). The selecting circuit 221 may selectively couple the fingerprint sensing lines (i.e., the sensing groups FS3 and FS4) in the fingerprint sensing region to the fingerprint driving circuit 222.

The fingerprint driving circuit 222 may be coupled to a plurality of fingerprint sensing lines of the display panel 210. The fingerprint driving circuit 222 may perform a fingerprint sensing operation using the fingerprint sensing lines in the fingerprint sensing region (step S320). In particular, when the fingerprint driving circuit 222 performs the fingerprint sensing operation using the fingerprint sensing lines in the fingerprint sensing region, the fingerprint driving circuit 222 may keep (maintain) the fingerprint sensing lines in the non-fingerprint sensing region (such as the sensing groups FS1, FS2, and FSn shown in FIG. 2) in an electrically non-floating state (step S330). The line is said to be non-floating (electrically non-floating state) when the line is electrically connected to a certain voltage source. That is, the fingerprint driving circuit 222 may receive a plurality of sensing signals from the plurality of fingerprint sensing lines in the fingerprint sensing region to obtain a fingerprint image data and not receive a plurality of sensing signals from the fingerprint sensing lines in the non-fingerprint sensing region to obtain any fingerprint image data.

Figure 4:
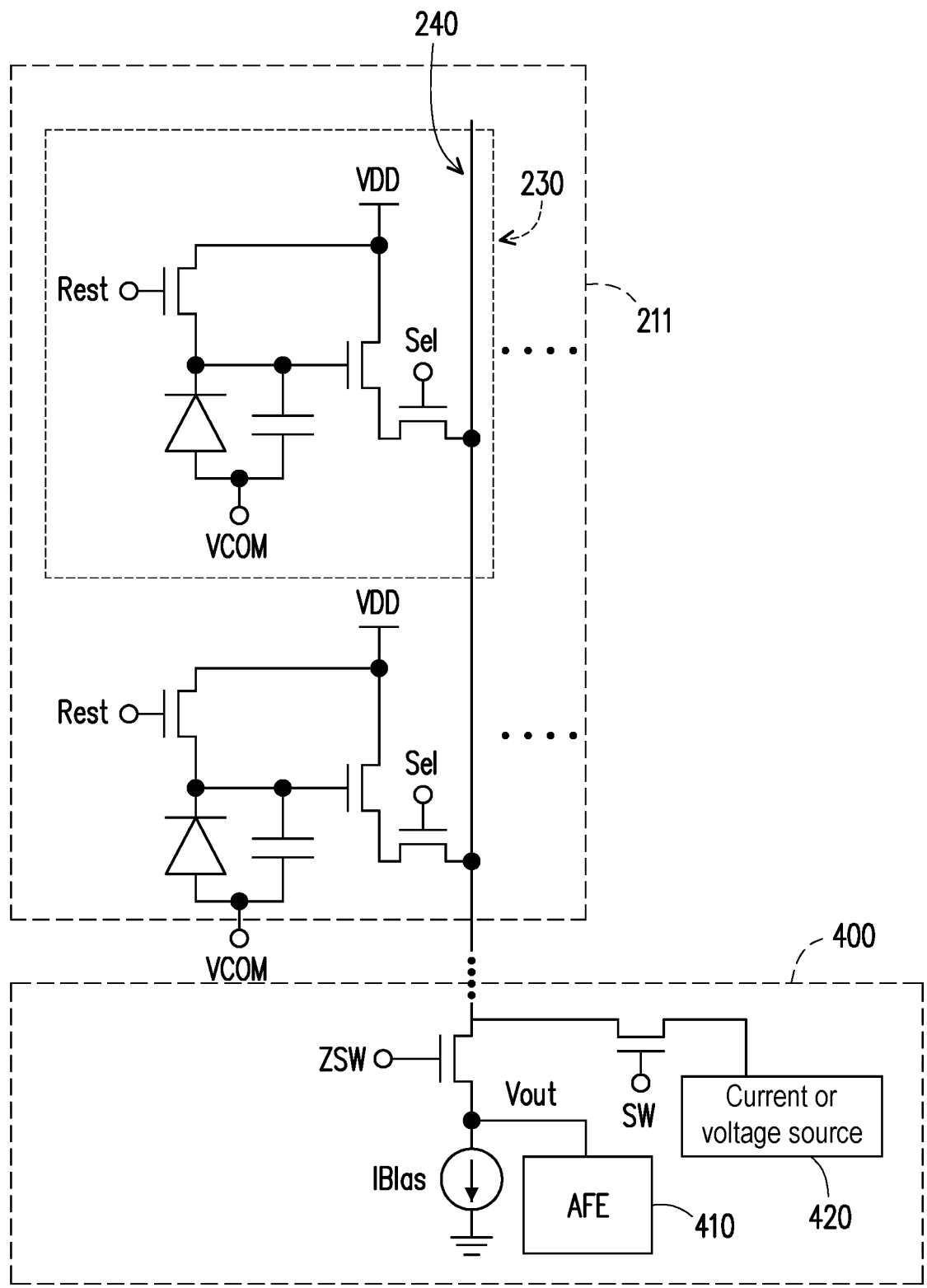
FIG. 4 is a circuit block diagram of the fingerprint driving circuit according to an embodiment of the invention.

FIG. 4 is a circuit block diagram of the fingerprint driving circuit 400 according to an embodiment of the invention. The display panel 210 and the fingerprint driving circuit 222 shown in FIG. 2 can refer to the relevant description of the display panel 211 and the fingerprint driving circuit 400 shown in FIG. 4, and (or) the display panel 211 and the fingerprint driving circuit 400 shown in FIG. 4 can refer to the relevant description of the display panel 210 and the fingerprint driving circuit 222 shown in FIG. 2. The display panel 211 shown in FIG. 4 has a fingerprint sensor array, and the fingerprint sensor array has a plurality of fingerprint sensing lines (such as fingerprint sensing lines 240) and a plurality of fingerprint sensing unit pixels (such as fingerprint sensing unit pixels 230). In each fingerprint sensing unit pixel 230, VDD represents a power supply voltage, Res represents a reset signal, VCOM represents a common voltage, and Sel represents a selection signal. The implementation of the fingerprint sensing unit pixels 230 should not be limited to the circuit shown in FIG. 4. According to actual design, in other embodiments, the fingerprint sensing unit pixels 230 may include a conventional fingerprint sensing circuit or other unit pixels.

The fingerprint driving circuit 400 shown in FIG. 4 includes a switch ZSW, a current source IBIas, an analog front-end (AFE) circuit 410, a switch SW, and a current or voltage source 420. The first terminal of the switch ZSW is adapted to be coupled to a corresponding fingerprint sensing line (for example, the fingerprint sensing lines 240) in the plurality of fingerprint sensing lines of the display panel 211. The current source IBIas is coupled to the second terminal of the switch ZSW. The AFE circuit 410 corresponds to the fingerprint sensing lines 240. The AFE circuit 410 is coupled to the second terminal of the switch ZSW. When the fingerprint sensing lines 240 are located in the fingerprint sensing region, the AFE circuit 410 may receive a sensing signal from the fingerprint sensing lines 240 through the switch ZSW. When the fingerprint sensing lines 240 are located in the non-fingerprint sensing region, the AFE circuit 410 is not coupled to the fingerprint sensing lines 240 and does not receive any sensing signal from the fingerprint sensing lines 240.

The first terminal of the switch SW is adapted to be coupled to a corresponding fingerprint sensing line (for example, the fingerprint sensing lines 240). The current or voltage source 420 is coupled to the second terminal of the switch SW. When the fingerprint sensing unit pixels 230 and the fingerprint sensing lines 240 belong to the fingerprint sensing region, the switch ZSW is turned on, and the switch SW is turned off. When the fingerprint sensing lines 240 belong to the fingerprint sensing region, the current or voltage source 420 is not coupled to the fingerprint sensing lines 240, and the current source IBIas may bias the fingerprint sensing lines 240 so that the fingerprint sensing unit pixel 230 may provide a sensing signal to the AFE circuit 410. Therefore, the AFE circuit 410 may read the sensing result (a fingerprint sensing voltage Vout) of the fingerprint sensing unit pixels 230.

When the fingerprint sensing unit pixels 230 and the fingerprint sensing lines 240 belong to the non-fingerprint sensing region, the switch ZSW is turned off, and the switch SW is turned on. Therefore, when the fingerprint sensing lines 240 belong to the non-fingerprint sensing region, the current or voltage source 420 may be coupled to the fingerprint sensing lines 240 such that the fingerprint sensing lines 240 in the non-fingerprint sensing region are kept in an electrically non-floating state. According to actual design, the current or voltage source 420 may include a current source, a voltage source, and/or other bias circuits. In the case where the current or voltage source 420 includes a current source, when the fingerprint sensing lines 240 belong to the non-fingerprint sensing region, the current or voltage source 420 may draw a bias current to the fingerprint sensing lines 240 (or provide a bias current to the fingerprint sensing lines 240), such that the fingerprint sensing lines 240 are kept in an electrically non-floating state. In the case where the current or voltage source 420 includes a voltage source, when the fingerprint sensing lines 240 belong to the non-fingerprint sensing region, the current or voltage source 420 may provide a bias voltage (any fixed reference voltage, such as ground voltage) to the fingerprint sensing lines 240 to keep (maintain) the fingerprint sensing lines 240 in an electrically non-floating state.

Figure 5:
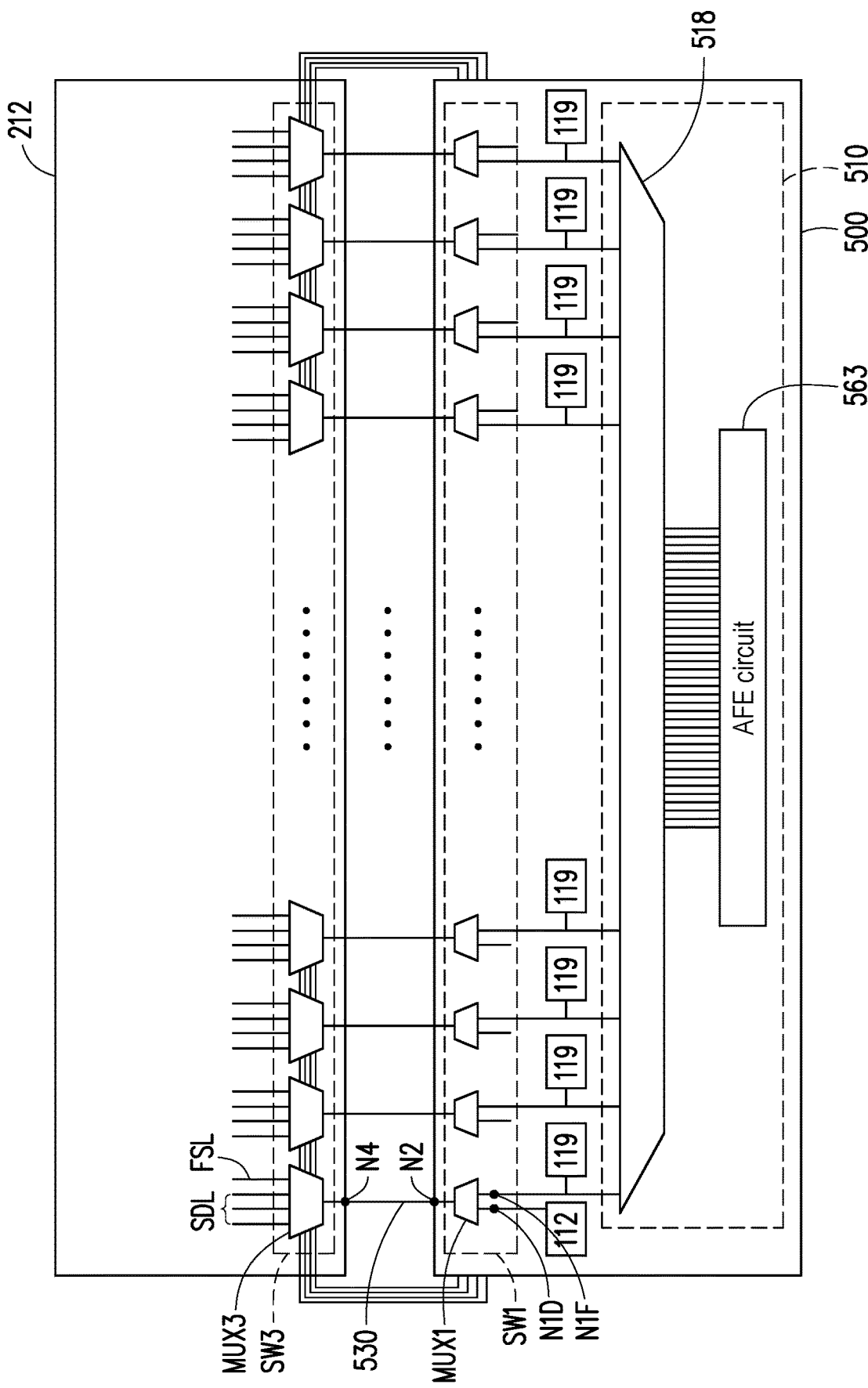
FIG. 5 is a circuit block diagram of the fingerprint sensing device according to another embodiment of the invention.

FIG. 5 is a circuit block diagram of the fingerprint sensing device 500 according to another embodiment of the invention. Referring to FIG. 5, the display panel 212 contains a switching unit SW3 and a common bonding pad N4. The switching unit SW3 includes a plurality of switch circuits, such as switch circuits MUX3. The other switch circuits of the switching unit SW3 may be deduced by referring to the relevant description of the switch circuits MUX3 and are therefore not repeated herein. One selection terminal of the switch circuits MUX3 is coupled to a corresponding fingerprint sensing line (for example, a fingerprint sensing line FSL). The fingerprint sensing line FSL shown in FIG. 5 may be deduced with reference to the relevant description of the fingerprint sensing lines 240 shown in FIG. 4 and is therefore not repeated herein. Some other selection terminals of the switch circuits MUX3 shown in FIG. 5 are respectively coupled to different display data lines SDL, as shown in FIG. 5. The common terminal of the switch circuits MUX3 is coupled to the common bonding pad N4.

The fingerprint sensing device 220 shown in FIG. 2 can refer to the fingerprint sensing device 500 shown in FIG. 5, and (or) the fingerprint sensing device 500 shown in FIG. 5 can refer to the relevant description of the fingerprint sensing device 220 shown in FIG. 2. The fingerprint sensing device 500 shown in FIG. 5 includes a common bonding pad N2, a switching unit SW1, a sensing circuit 510, and an anti-floating circuit 119. The common bonding pad N2 is adapted to be coupled to the common bonding pad N4 through a transmission line 530. The switching unit SW1 includes a plurality of switch circuits, such as switch circuits MUX1. The other switch circuits of the switching unit SW1 may be deduced by referring to the relevant description of the switch circuits MUX1 and are therefore not repeated herein. The common terminal of the switch circuits MUX1 is coupled to the common bonding pad N2. The sensing circuit 510 and the anti-floating circuit 119 are coupled to one selection terminal N1F of the switch circuits MUX1, and a display driving circuit 112 is coupled to another selection terminal N1D of the switch circuits MUX1. When the corresponding fingerprint sensing line (for example, the fingerprint sensing line FSL) belongs to the fingerprint sensing region, the sensing circuit 510 may perform a fingerprint sensing operation on the fingerprint sensing line FSL through the switch circuits MUX1, the common bonding pad N2, the common bonding pad N4, and the switch circuits MUX3.

The sensing circuit 510 shown in FIG. 5 includes a switch circuit 518 and an AFE circuit 563. A plurality of selection terminals of the switch circuit 518 are respectively coupled to one selection terminal of the different switch circuits MUX1 of the switching unit SW1, and the common terminal of the switch circuit 518 is coupled to the AFE circuit 563. The switch circuit 518 and the AFE circuit 563 shown in FIG. 5 may be deduced by referring to the related description of the switch ZSW and the AFE circuit 410 shown in FIG. 4 and are therefore not repeated herein. The switching unit SW1 and the switch circuit 518 may be used as components of the selection circuit 221 shown in FIG. 2, and the anti-floating circuit 119 and the AFE circuit 563 may be used as components of the fingerprint driving circuit 222 shown in FIG. 2.

The anti-floating circuit 119 is coupled to the selection terminal of the second switch circuit. When the corresponding fingerprint sensing line (for example, the fingerprint sensing line FSL) belongs to the non-fingerprint sensing region, the anti-floating circuit 119 may keep (maintain) the corresponding fingerprint sensing line FSL in an electrically non-floating state. For example, when the fingerprint sensing line FSL belongs to the fingerprint sensing region, the anti-floating circuit 119 is disabled; when the fingerprint sensing line FSL belongs to the non-fingerprint sensing region, the anti-floating circuit 119 is enabled such that the fingerprint sensing line FSL is kept in an electrically non-floating state.

In some embodiments, the anti-floating circuit 119 may include a switch (not shown in FIG. 5) and a current or voltage source (not shown in FIG. 5). The first terminal of the switch is coupled to the selection terminal of the switch circuits MUX1. The current or voltage source is coupled to the second terminal of the second switch. The current or voltage source may provide a reference current to the corresponding fingerprint sensing line FSL through the switch, the switch circuits MUX1, the common bonding pad N2, the common bonding pad N4, and the switch circuits MUX3, such that the fingerprint sensing line FSL is kept in an electrically non-floating state. The switch and the current or voltage source of the anti-floating circuit 119 shown in FIG. 5 may be deduced with reference to the related description of the switch SW and the current or voltage source 420 shown in FIG. 4 and are therefore not repeated herein.

Figure 6:
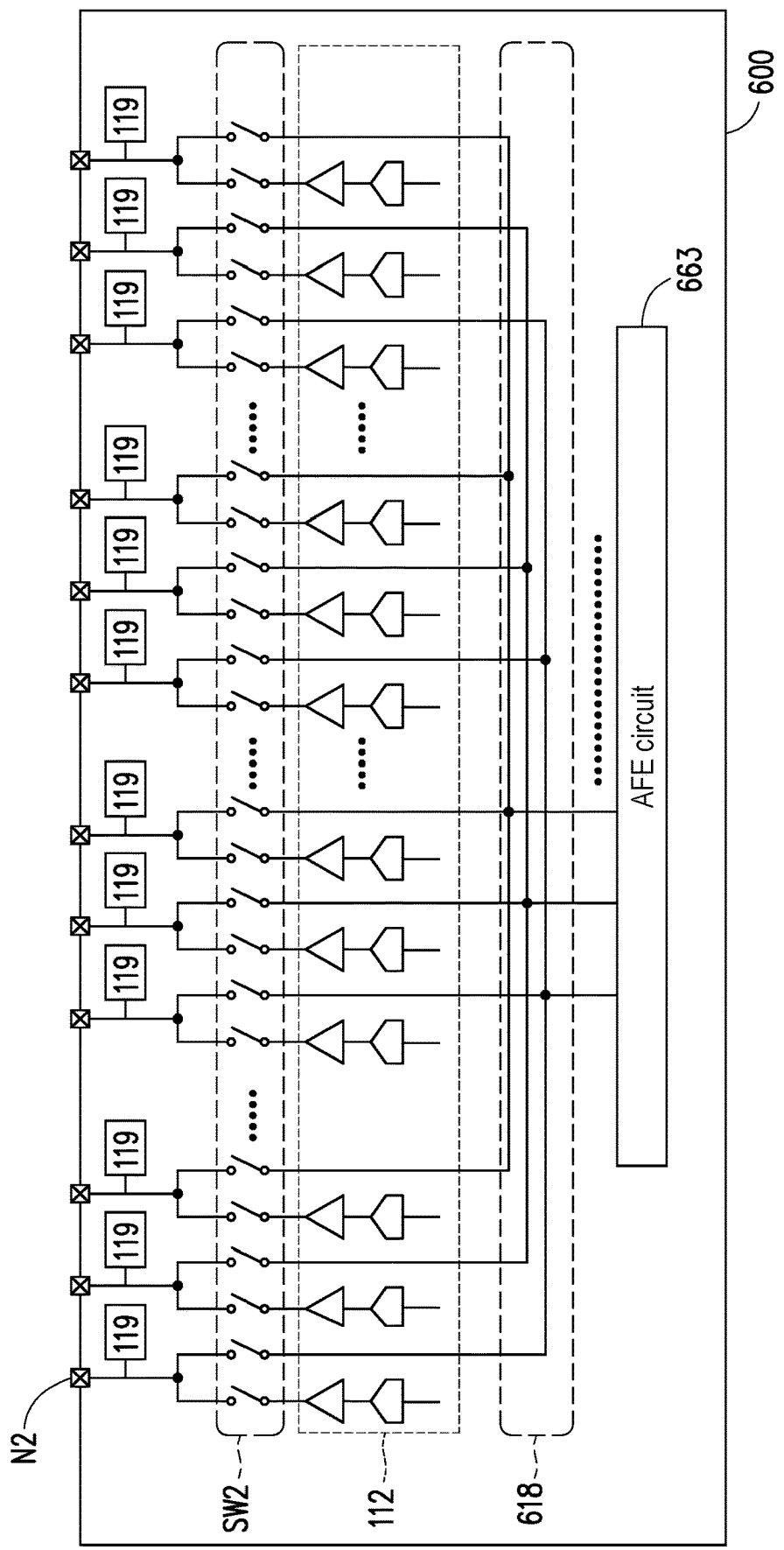
FIG. 6 is a circuit block diagram of the fingerprint sensing device according to yet another embodiment of the invention.

FIG. 6 is a circuit block diagram of the fingerprint sensing device 600 according to yet another embodiment of the invention. The fingerprint sensing device 220 shown in FIG. 2 can refer to the fingerprint sensing device 600 shown in FIG. 6, and (or) the fingerprint sensing device 600 shown in FIG. 6 can refer to the relevant description of the fingerprint sensing device 220 shown in FIG. 2. The fingerprint sensing device 600 shown in FIG. 6 includes the common bonding pad N2, the anti-floating circuit 119, the switching unit SW2, the display driving circuit 112, a switch circuit 618, and an AFE circuit 663. The fingerprint sensing device 600, the common bonding pad N2, the anti-floating circuit 119, the switching unit SW2, the display driving circuit 112, the switch circuit 618, and the AFE circuit 663 shown in FIG. 6 are as provided in related descriptions of the fingerprint sensing device 500, the common bonding pad N2, the anti-floating circuit 119, the switching unit SW1, the display driving circuit 112, the switch circuit 518, and the AFE circuit 563 shown in FIG. 5 and are therefore not repeated herein. In the embodiment shown in FIG. 6, the anti-floating circuit 119 is coupled to the common bonding pad N2. When the corresponding fingerprint sensing line (for example, the fingerprint sensing line FSL shown in FIG. 5) belongs to the non-fingerprint sensing region, the anti-floating circuit 119 may keep (maintain) the corresponding fingerprint sensing line in an electrically non-floating state.

Figure 7:
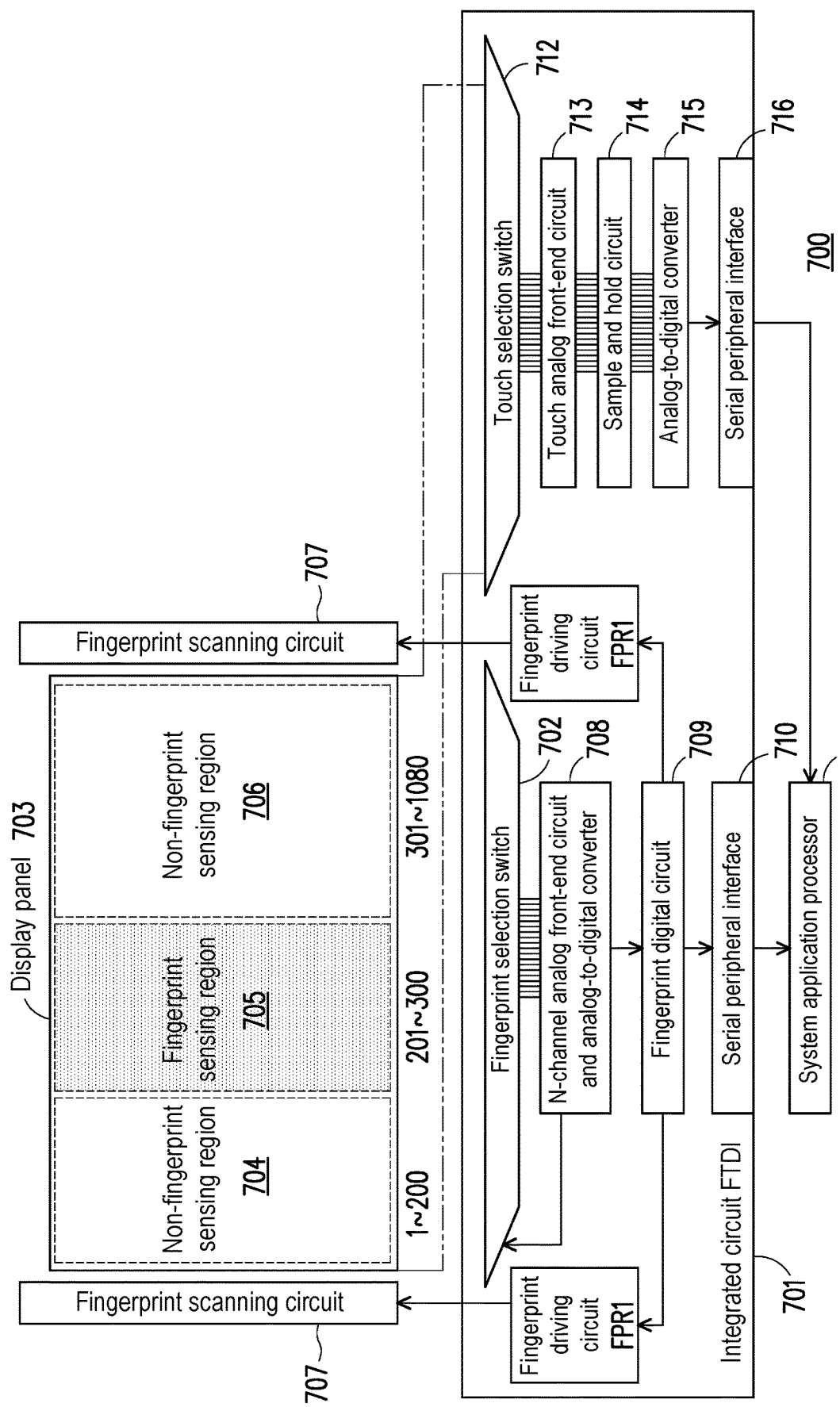
FIG. 7 is a functional block diagram of an electronic apparatus according to another embodiment of the invention.

FIG. 7 is a functional block diagram of an electronic apparatus 700 according to another embodiment of the invention. The electronic apparatus 700 shown in FIG. 7 contains an integrated circuit FTDI 701, a display panel 703, and a system application processor 711. The display panel 703 may be any display panel with a fingerprint sensing function. The display panel 703 shown in FIG. 7 has a fingerprint scanning circuit 707 and 1080 fingerprint sensing lines, wherein the 1080 fingerprint sensing lines contain a fingerprint sensing region 705 and non-fingerprint sensing regions 704 and 706, and the 1st to 200th fingerprint sensing lines belong to the non-fingerprint sensing region 704, the 301st to 1080th fingerprint sensing lines belong to the non-fingerprint sensing region 706, and the 201st to 300th fingerprint sensing lines belong to the fingerprint sensing region 705. Any one of the 1080 fingerprint sensing lines of the display panel 703 may be deduced by referring to the related description of the fingerprint sensing lines 240 shown in FIG. 4, and are not repeated herein. The integrated circuit FTDI 701 contains a touch selection switch 712, a touch analog front-end circuit 713, a sample and hold circuit 714, an analog-to-digital converter 715, a serial peripheral interface 716, a fingerprint drive circuit FPR1, a fingerprint selection switch 702, an N-channel analog front-end circuit and analog-to-digital converter 708, a fingerprint digital circuit 709, and a serial peripheral interface 710. According to actual design, the touch sensing circuit containing the selection switch 712, the touch analog front-end circuit 713, the sample and hold circuit 714, the analog-to-digital converter 715, and the serial peripheral interface 716 may be a general touch sensing circuit or other touch sensing circuits and is not repeated herein.

The integrated circuit FTDI 701 may perform a fingerprint frame capture operation on the fingerprint sensing lines of the fingerprint sensing region 705 selected by the fingerprint selection switch 702. The fingerprint digital circuit 709 may read the fingerprint frame capture operation result (fingerprint frame) through the N-channel analog front-end circuit and analog-to-digital converter 708, and then transmit the fingerprint frame capture operation result to the external system application processor 711 through the serial peripheral interface 710. The integrated circuit FTDI 701 may draw current or apply voltage to any one of the 1080 fingerprint sensing lines (that is, the fingerprint sensing line not selected by the fingerprint selection switch 702) belonging to the non-fingerprint sensing regions 704 and 706 through an anti-floating circuit (not shown in FIG. 7, and it may be deduced by referring to the relevant description of the current or voltage source 420 shown in FIG. 4, or by referring to the relevant description of the anti-floating circuit 119 shown in FIG. 5 or 6.).

Based on the above, the fingerprint sensing device, the fingerprint driving circuit, the electronic apparatus, and the operation method of the fingerprint sensing device according to the embodiments of the invention may avoid display abnormality in the non-fingerprint sensing region of the display panel as much as possible by keeping the fingerprint sensing lines in the non-fingerprint sensing region in an electrically non-floating state.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A fingerprint sensing device to sense a fingerprint on a display panel, comprising:
   a selecting circuit, to select a fingerprint sensing region of the display panel, wherein a non-fingerprint sensing region belongs to at least a partial region of the display panel but does not belong to the fingerprint sensing region; and
   a fingerprint driving circuit coupled to a plurality of fingerprint sensing lines of the display panel, wherein when the fingerprint driving circuit performs a fingerprint sensing operation, the fingerprint driving circuit maintains the plurality of fingerprint sensing lines in the non-fingerprint sensing region in an electrically non-floating state.

2. The fingerprint sensing device according to claim 1, wherein the fingerprint sensing region corresponds to a touched region of the display panel.

3. The fingerprint sensing device according to claim 1, wherein the fingerprint driving circuit receive sensing signals from the plurality of fingerprint sensing lines in the fingerprint sensing region to obtain a fingerprint image data and not receive sensing signals from the plurality of fingerprint sensing lines in the non-fingerprint sensing region to obtain any fingerprint image data.

4. The fingerprint sensing device according to claim 1, wherein the fingerprint driving circuit further comprises an analog front-end circuit coupled to a first fingerprint sensing line belonged to the fingerprint sensing region.

5. The fingerprint sensing device according to claim 1, wherein the fingerprint driving circuit comprises an analog front-end circuit and a switch coupled between at least one corresponding fingerprint sensing line and the analog front-end circuit, wherein the switch is configured to be turned on and off respectively when the at one corresponding fingerprint sensing line is located in the fingerprint sensing region and the non-fingerprint sensing region.

6. The fingerprint sensing device according to claim 1, wherein the fingerprint driving circuit further comprises a current or voltage source corresponding to at least one first fingerprint sensing line, and the current or voltage source is coupled the at least one first fingerprint sensing line when the at least one first fingerprint sensing line is in the non-fingerprint sensing region and the at least one first fingerprint sensing line in the non-fingerprint sensing region is kept in the electrically non-floating state.

7. The fingerprint sensing device according to claim 6, wherein when the at least one first fingerprint sensing line is in the non-fingerprint sensing region, the at least one first fingerprint sensing line is coupled to a current source of the fingerprint driving circuit.

8. The fingerprint sensing device according to claim 6, wherein when the at least one first fingerprint sensing line is in the non-fingerprint sensing region, the at least one first fingerprint sensing line is coupled to a voltage source of the fingerprint driving circuit.

9. The fingerprint sensing device according to claim 1, wherein the fingerprint driving circuit comprises:
   a first switch, having a first terminal adapted to be coupled to a corresponding fingerprint sensing line in the plurality of fingerprint sensing lines of the display panel;
   a current source, coupled to a second terminal of the first switch;
   an analog front-end circuit, coupled to the second terminal of the first switch;
   a second switch, having a first terminal coupled to the corresponding fingerprint sensing line; and
   a current or voltage source, coupled to a second terminal of the second switch.

10. The fingerprint sensing device according to claim 9, wherein the current or voltage source maintains the corresponding fingerprint sensing line in the electrically non-floating state when the corresponding fingerprint sensing line belongs to the non-fingerprint sensing region.

11. The fingerprint sensing device according to claim 9, wherein the first switch is turned on when the corresponding fingerprint sensing line belongs to the fingerprint sensing region, and the first switch is turned off when the corresponding fingerprint sensing line belongs to the non-fingerprint sensing region.

12. The fingerprint sensing device according to claim 9, wherein the second switch is turned off when the corresponding fingerprint sensing line belongs to the fingerprint sensing region, and the second switch is turned on when the corresponding fingerprint sensing line belongs to the non-fingerprint sensing region.

13. The fingerprint sensing device according to claim 1, wherein the display panel comprises a first switch circuit and a first common bonding pad, a selection terminal of the first switch circuit is coupled to a corresponding fingerprint sensing line in the plurality of fingerprint sensing lines, a common terminal of the first switch circuit is coupled to the first common bonding pad, and the fingerprint driving circuit comprises:
   a second common bonding pad coupled to the first common bonding pad;
   a second switch circuit, having a common terminal coupled to the second common bonding pad;
   a sensing circuit, coupled to a selection terminal of the second switch circuit, and to perform the fingerprint sensing operation on the corresponding fingerprint sensing line through the second switch circuit, the second common bonding pad, the first common bonding pad, and the first switch circuit when the corresponding fingerprint sensing line belongs to the fingerprint sensing region; and an anti-floating circuit, coupled to the selection terminal of the second switch circuit, to maintain the corresponding fingerprint sensing line in the electrically non-floating state when the corresponding fingerprint sensing line belongs to the non-fingerprint sensing region.

14. The fingerprint sensing device according to claim 13, wherein the anti-floating circuit is disabled when the corresponding fingerprint sensing line belongs to the fingerprint sensing region, and the anti-floating circuit is enabled to maintain the corresponding fingerprint sensing line in the electrically non-floating state when the corresponding fingerprint sensing line belongs to the non-fingerprint sensing region.

15. The fingerprint sensing device according to claim 13, wherein the anti-floating circuit comprises:
    a switch, having a first terminal coupled to the selection terminal of the second switch circuit; and
    a current or voltage source, coupled to a second terminal of the switch, and providing a reference current to the corresponding fingerprint sensing line through the switch, the second switch circuit, the second common bonding pad, the first common bonding pad, and the first switch circuit to maintain the corresponding fingerprint sensing line in the electrically non-floating state.

16. The fingerprint sensing device according to claim 15, wherein the switch is turned off when the corresponding fingerprint sensing line belongs to the fingerprint sensing region, and the switch is turned on when the corresponding fingerprint sensing line belongs to the non-fingerprint sensing region.

17. The fingerprint sensing device according to claim 1, wherein the display panel comprises a first switch circuit and a first common bonding pad, a selection terminal of the first switch circuit is coupled to a corresponding fingerprint sensing line in the plurality of fingerprint sensing lines, a common terminal of the first switch circuit is coupled to the first common bonding pad, and the fingerprint driving circuit comprises:
    a second common bonding pad coupled to the first common bonding pad;
    a second switch circuit, having a common terminal coupled to the second common bonding pad;
    a sensing circuit, coupled to a selection terminal of the second switch circuit, to perform the fingerprint sensing operation on the corresponding fingerprint sensing line through the second switch circuit, the second common bonding pad, the first common bonding pad, and the first switch circuit when the corresponding fingerprint sensing line belongs to the fingerprint sensing region; and
    an anti-floating circuit, coupled to the second common bonding pad, to maintain the corresponding fingerprint sensing line in the electrically non-floating state when the corresponding fingerprint sensing line belongs to the non-fingerprint sensing region.

18. The fingerprint sensing device according to claim 17, wherein the anti-floating circuit is disabled when the corresponding fingerprint sensing line belongs to the fingerprint sensing region, and the anti-floating circuit is enabled to maintain the corresponding fingerprint sensing line in the electrically non-floating state when the corresponding fingerprint sensing line belongs to the non-fingerprint sensing region.

19. A fingerprint driving circuit, comprising:
    a first switch, having a first terminal coupled to a corresponding fingerprint sensing line in a plurality of fingerprint sensing lines of a display panel;
    a current source, coupled to a second terminal of the first switch;
    an analog front-end circuit, coupled to the second terminal of the first switch;
    a second switch, having a first terminal coupled to the corresponding fingerprint sensing line; and
    a current or voltage source, coupled to a second terminal of the second switch.

20. The fingerprint driving circuit according to claim 19, wherein the current or voltage source maintains the corresponding fingerprint sensing line in an electrically non-floating state when the corresponding fingerprint sensing line belongs to a non-fingerprint sensing region.

21. The fingerprint driving circuit according to claim 19, wherein the current source bias the corresponding fingerprint sensing line when the corresponding fingerprint sensing line belongs to a fingerprint sensing region.

22. The fingerprint driving circuit according to claim 19, wherein the first switch is turned on when the corresponding fingerprint sensing line belongs to a fingerprint sensing region, and the first switch is turned off when the corresponding fingerprint sensing line belongs to a non-fingerprint sensing region.

23. The fingerprint driving circuit according to claim 19, wherein the second switch is turned off when the corresponding fingerprint sensing line belongs to a fingerprint sensing region, and the second switch is turned on when the corresponding fingerprint sensing line belongs to a non-fingerprint sensing region.

24. An electronic apparatus, comprising:
    a display panel, comprising a plurality of fingerprint sensing lines; and
    a fingerprint sensing device for sensing a fingerprint on the display panel, comprising:
        a selecting circuit, obtaining a fingerprint sensing region corresponding to a touched region of the display panel, wherein a non-fingerprint sensing region belongs to at least a partial region of the display panel but does not belong to the fingerprint sensing region; and
        a fingerprint driving circuit, coupled to the plurality of fingerprint sensing lines of the display panel, wherein when the fingerprint driving circuit performs a fingerprint sensing operation, the fingerprint driving circuit maintains the plurality of fingerprint sensing lines in the non-fingerprint sensing region in an electrically non-floating state.

25. An operation method of a fingerprint sensing device, comprising:
    selecting a fingerprint sensing region corresponding to a touched region of the display panel, wherein a non-fingerprint sensing region belongs to at least a partial region of the display panel but does not belong to the fingerprint sensing region;
    performing a fingerprint sensing operation on a plurality of fingerprint sensing lines in the fingerprint sensing region; and
    maintaining the plurality of fingerprint sensing lines in the non-fingerprint sensing region in an electrically non-floating state when the fingerprint driving circuit performs the fingerprint sensing operation on the plurality of fingerprint sensing lines in the fingerprint sensing region.

26. The operation method according to claim 25, further comprising:
   providing a first current to a corresponding fingerprint sensing line through a first switch, and performing, by an analog front-end circuit, the fingerprint sensing operation on the corresponding fingerprint sensing line through the first switch when the fingerprint driving circuit performs the fingerprint sensing operation on the corresponding fingerprint sensing line;
   turning off the first switch when the corresponding fingerprint sensing line belongs to the non-fingerprint sensing region;
   providing, by a current or voltage source, a second current to the corresponding fingerprint sensing line through a second switch to maintain the corresponding fingerprint sensing line in the electrically non-floating state when the corresponding fingerprint sensing line belongs to the non-fingerprint sensing region; and
   turning off the second switch when the fingerprint driving circuit performs the fingerprint sensing operation on the corresponding fingerprint sensing line.

27. The operation method according to claim 25, further comprising:
   providing, by a current source, a reference current to a corresponding fingerprint sensing line in the plurality of fingerprint sensing lines through a first switch, and performing, by an analog front-end circuit, the fingerprint sensing operation on the corresponding fingerprint sensing line through the first switch when the fingerprint driving circuit performs the fingerprint sensing operation on the corresponding fingerprint sensing line;
   turning off the first switch when the corresponding fingerprint sensing line belongs to the non-fingerprint sensing region;
   providing, by a current or voltage source, a reference voltage to the corresponding fingerprint sensing line through a second switch to maintain the corresponding fingerprint sensing line in the electrically non-floating state when the corresponding fingerprint sensing line belongs to the non-fingerprint sensing region; and
   turning off the second switch when the fingerprint driving circuit performs the fingerprint sensing operation on the corresponding fingerprint sensing line.

* * * * *